United States Patent
Eryurek et al.

(10) Patent No.: US 6,859,755 B2
(45) Date of Patent: Feb. 22, 2005

(54) DIAGNOSTICS FOR INDUSTRIAL PROCESS CONTROL AND MEASUREMENT SYSTEMS

(75) Inventors: Evren Eryurek, Minneapolis, MN (US); Dale W. Borgeson, Minneapolis, MN (US); Marcos Peluso, Chanhassen, MN (US); Gregory H. Rome, Fridley, MN (US); Weston R. Roper, St. Louis Park, MN (US)

(73) Assignee: Rosemount Inc., Eden Prairie, MN (US)

( * ) Notice: Subject to any disclaimer, the term of this patent is extended or adjusted under 35 U.S.C. 154(b) by 148 days.

(21) Appl. No.: 09/855,179

(22) Filed: May 14, 2001

(65) Prior Publication Data

US 2002/0169582 A1 Nov. 14, 2002

(51) Int. Cl.[7] .............................................. G06F 11/30
(52) U.S. Cl. ...................................... 702/183; 700/117
(58) Field of Search ......................... 327/512; 702/183, 702/179; 700/117, 10, 79; 340/310.01; 709/230; 710/269

(56) References Cited

U.S. PATENT DOCUMENTS

| | | | |
|---|---|---|---|
| 4,249,164 A | 2/1981 | Tivy ........................ 340/870.3 |
| 4,528,869 A | 7/1985 | Kubo et al. .................... 74/695 |
| 4,668,476 A | 5/1987 | Bridgham et al. ............ 422/62 |
| 4,720,806 A | 1/1988 | Schippers et al. .......... 364/551 |
| 4,807,151 A | 2/1989 | Citron ........................ 364/510 |
| 5,019,760 A | 5/1991 | Chu et al. ................... 318/490 |
| 5,089,979 A | 2/1992 | McEachern et al. ... 364/571.04 |
| 5,434,774 A | 7/1995 | Seberger ..................... 364/172 |
| 5,436,705 A | 7/1995 | Raj ............................. 355/246 |
| 5,469,749 A | 11/1995 | Shimada et al. ......... 73/861.47 |
| 5,526,293 A | 6/1996 | Mozumder et al. ......... 364/578 |
| 5,539,638 A | 7/1996 | Keeler et al. .......... 364/424.03 |
| 5,669,713 A | 9/1997 | Schwartz et al. ............... 374/1 |
| 5,700,090 A | 12/1997 | Eryurek ....................... 374/210 |
| 5,703,575 A | 12/1997 | Kirkpatrick ............ 340/870.17 |
| 5,719,378 A | 2/1998 | Jackson, Jr. et al. ........ 219/497 |
| 5,741,074 A | 4/1998 | Wang et al. ................ 374/185 |
| 5,828,567 A * | 10/1998 | Eryurek et al. ................ 700/79 |
| 5,829,876 A | 11/1998 | Schwartz et al. ............... 374/1 |
| 5,838,187 A * | 11/1998 | Embree ....................... 327/512 |
| 5,848,383 A | 12/1998 | Yunus ........................ 702/102 |
| 5,876,122 A | 3/1999 | Eryurek ....................... 374/183 |
| 5,926,778 A | 7/1999 | Pöppel ....................... 702/130 |
| 5,936,514 A * | 8/1999 | Anderson et al. ...... 340/310.01 |
| 5,970,430 A * | 10/1999 | Burns et al. ................ 700/117 |

(List continued on next page.)

FOREIGN PATENT DOCUMENTS

| | | |
|---|---|---|
| DE | 32 13 866 A1 | 10/1983 |
| DE | 35 40 204 C1 | 9/1986 |

(List continued on next page.)

OTHER PUBLICATIONS

"A TCP\IP Tutorial" by, Socolofsky et al., Spider Systems Limited, Jan. 1991 pp. 1–23.

(List continued on next page.)

Primary Examiner—John Barlow
Assistant Examiner—Xiuqin Sun
(74) Attorney, Agent, or Firm—Westman, Champlin & Kelly, P.A.

(57) ABSTRACT

A field device includes diagnostic circuitry adapted to measure a characteristic related to a process control and measurement system. The measured characteristic is used to provide a diagnostic output indicative of a condition of the process control and measurement system. The measured characteristic can be provided to a diagnostic module that operates upon the measured characteristic to predict, or otherwise model, a condition of the process control and measurement system.

19 Claims, 5 Drawing Sheets

U.S. PATENT DOCUMENTS

| | | | | |
|---|---|---|---|---|
| 6,023,399 | A | 2/2000 | Kogure | 361/23 |
| 6,026,352 | A | 2/2000 | Burns et al. | 702/182 |
| 6,045,260 | A | 4/2000 | Schwartz et al. | 374/183 |
| 6,047,220 | A * | 4/2000 | Eryurek | 700/10 |
| 6,094,600 | A | 7/2000 | Sharpe, Jr. et al. | 700/19 |
| 6,151,560 | A | 11/2000 | Jones | 702/58 |
| 6,179,964 | B1 | 1/2001 | Begemann et al. | 162/198 |
| 6,192,281 | B1 | 2/2001 | Brown et al. | 700/2 |
| 6,195,591 | B1 | 2/2001 | Nixon et al. | 700/83 |
| 6,263,487 | B1 | 7/2001 | Stripf et al. | 717/1 |
| 6,298,377 | B1 | 10/2001 | Hartikainen et al. | 709/223 |
| 6,360,277 | B1 * | 3/2002 | Ruckley et al. | 709/230 |
| 6,425,038 | B1 * | 7/2002 | Sprecher | 710/269 |
| 6,466,893 | B1 * | 10/2002 | Latwesen et al. | 702/179 |

FOREIGN PATENT DOCUMENTS

| | | |
|---|---|---|
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 299 17 651 U1 | 12/2000 |
| EP | 0 122 622 A1 | 10/1984 |
| EP | 0 413 814 A1 | 2/1991 |
| EP | 0 487 419 A2 | 5/1992 |
| EP | 0 512 794 A2 | 11/1992 |
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1058093 A1 | 5/1999 |
| FR | 2 302 514 | 9/1976 |
| FR | 2 334 827 | 7/1977 |
| GB | 928704 | 6/1963 |
| GB | 1 534 280 | 11/1978 |
| GB | 2 310 346 A | 8/1997 |
| GB | 2 347 232 | 8/2000 |
| JP | 58-129316 | 8/1983 |
| JP | 59-116811 | 7/1984 |
| JP | 59-211196 | 11/1984 |
| JP | 59-211896 | 11/1984 |
| JP | 60-507 | 1/1985 |
| JP | 60-76619 | 5/1985 |
| JP | 60-131495 | 7/1985 |
| JP | 62-30915 | 2/1987 |
| JP | 64-1914 | 1/1989 |
| JP | 64-72699 | 3/1989 |
| JP | 2-5105 | 1/1990 |
| JP | 03229124 | 10/1991 |
| JP | 5-122768 | 5/1993 |
| JP | 06242192 | 9/1994 |
| JP | 7-63586 | 3/1995 |
| JP | 07234988 | 9/1995 |
| JP | 8-54923 | 2/1996 |
| JP | 8-136386 | 5/1996 |
| JP | 8-166309 | 6/1996 |
| JP | 08247076 | 9/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| WO | WO 94/25933 | 11/1994 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/14855 | 4/1998 |
| WO | WO 98/20469 | 5/1998 |
| WO | WO 98/39718 | 9/1998 |
| WO | WO 00/55700 | 9/2000 |
| WO | WO 00/70531 | 11/2000 |

OTHER PUBLICATIONS

"Approval Standards For Explosionproof Electrical Equipment General Requirements", Factory Mutual Research, Cl. No. 3615, Mar. 1989, pp. 1–34.

"Approval Standard Intrinsically Safe Apparatus and Associated Apparatus For Use In Class I, II, and III, Division 1 Hazardous (Classified) Locations", Factory Mutual Research, Cl. No. 3610, Oct. 1988, pp. 1–70.

"Automation On–line" by, Phillips et al., Plant Services, Jul. 1997, pp. 41–45.

"Climb to New Heights by Controlling your PLCs Over the Internet" by, Phillips et al., Intech, Aug. 1998, pp. 50–51.

"CompProcessor For Piezoresistive Sensors" MCA Technologies Inc. (MCA7707), pp. 1–8.

"Ethernet emerges as viable, inexpensive fieldbus", Paul G. Schreier, Personal Engineering, Dec. 1997, p. 23–29.

"Ethernet Rules Closed–loop System" by, Eidson et al., Intech, Jun. 1998, pp. 39–42.

"Fieldbus Standard for Use in Industrial Control Systems Part 2: Physical Layer Specification and Service Definition", ISA–S50.02–1992, pp. 1–93.

"Fieldbus Standard for Use in Industrial Control Systems Part 3: Data Link Service Definition", ISA–S50.02–1997, Part 3, Aug. 1997, pp. 1–159.

Fieldbus Standard For Use in Industrial Control Systems Part 4: Data Link Protocol Specification, ISA–S50.02–1997, Part 4, Aug. 1997, pp. 1–148.

"Fieldbus Support For Process Analysis" by, Blevins et al., Fisher–Rosemount Systems, Inc., 1995, pp. 121–128.

"Fieldbus Technical Overview Understanding FOUNDATION™ fieldbus technology", Fisher–Rosemount, 1998, pp. 1–23.

"Hypertext Transfer Protocol—HTTP/1.0" by, Berners–Lee et al., MIT/LCS, May 1996, pp. 1–54.

"Infranets, Intranets, and the Internet" by, Pradip Madan, Echelon Corp, Sensors, Mar. 1997, pp. 46–50.

"Internet Technology Adoption into Automation" by, Fondl et al., Automation Business, pp. 1–5.

"Internet Protocol Darpa Internet Program Protocol Specification" by, Information Sciences Institute, University of Southern California, RFC 791, Sep. 1981, pp. 1–43.

"Introduction to Emit", emWare, Inc., 1997, pp. 1–22.

"Introduction to the Internet Protocols" by, Charles L. Hedrick, Computer Science Facilities Group, Rutgers University, Oct. 3, 1988, pp. 1–97.

"Is There A Future For Ethernet in Industrial Control?", Miclot et al., Plant Engineering, Oct. 1988, pp. 44–46, 48, 50.

LFM/SIMA Internet Remote Diagnostics Research Project Summary Report, Stanford University, Jan. 23, 1997, pp. 1–6.

"Managing Devices with the Web" by, Howard et al., Byte, Sep. 1997, pp. 45–64.

"Modular Microkernel Links GUI And Browser For Embedded Web Devices" by, Tom Williams, pp. 1–2.

"PC Software Gets Its Edge From Windows, Components, and the Internet", Wayne Labs, I&CS, Mar. 1997, pp. 23–32.

Proceedings Sensor Expo, Aneheim, California, Produced by Expocon Managemnet Associates, Inc., Apr. 1996, pp. 9–21.

Proceedings Sensor Expo, Boston, Massachuttes, Produced by Expocon Management Associates, Inc., May 1997, pp. 1–416.

"Smart Sensor Network of the Future" by, Jay Warrior, Sensors, Mar. 1997, pp. 40–45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1–78.

"On–Line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *Commun. Statis.—Simula.*, 1995, pp. 409–437.

"A Knowledge–Based Approach for Detection and Diagnosis of Out–Of–Control Events in Manufacturing Processes," by P. Love et al., *IEEE*, 1989, pp. 736–741.

"Advanced Engine Diagnostics Using Universal Process Modeling", by P. O'Sullivan, *Presented at the 1996 SAE Conference on Future Transportation Technology*, pp. 1–9.

Parallel, Fault–Tolerant Control and Diagnostics System for Feedwater Regulation in PWRS, by E. Eryurek et al., *Proceedings of the American Power Conference*.

"Programmable Hardware Architectures for Sensor Validation", by M.P. Henry et al., *Control Eng. Practice*, vol. 4, No. 10., pp. 1339–1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040–1047.

"Signal Processing, Data Handling and Communications: The Case for Measurement Validation", by M.P. Henry, *Department of Engineering Science, Oxford University*.

"Smart Temperature Measurement in the '90s", by T. Kerlin et al., *C&I*, (1990).

"Software–Based Fault–Tolerant Control Design for Improved Power Plant Operation," *IEEE/IFAC Joint Symposium on Computer–Aided Control System Design*, Mar. 7–9, 1994 pp. 585–590.

A Standard Interface for Self–Validating Sensors, by M. P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1–4.

"Application of Neural Computing Paradigms for Signal Validation," by B.R. Upadhyaya et al., *Department of Nuclear Engineering*, pp. 1–18.

"Application of Neutral Networks for Sensor Validation and Plant Monitoring," by B. Upadhyaya et al., *Nuclear Technology*, vol. 97, No. 2, Feb. 1992 pp. 170–176.

"Automated Generation of Nonlinear System Characterization for Sensor Failure Detection," by B.R. Upadhyaya et al., *ISA*, 1989 pp. 269–274.

"In Situ Calibration of Nuclear Plant Platinum Resistance Thermometers Using Johnson Noise Methods," *EPRI*, Jun. 1983.

"Johnson Noise Thermometer for High Radiation and High–Temperature Environments," by L. Oakes et al., *Fifth Symposium on Space Nuclear Power Systems*, Jan. 1988, pp 2–23.

"Development of a Resistance Thermometer For Use Up to 1600° C", by M.J. de Groot et al., *CAL LAB*, Jul./Aug. 1996, pp. 38–41.

"Survey, Applications, And Prospects of Johnson Noise Thermometry," by T. Blalock et al., *Electrical Engineering Department*, 1981 pp. 2–11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249–1259.

"Field–based Architecture is Based on Open Systems, Improves Plant Performance", by P. Cleaveland, *I&CS*, Aug. 1996, pp. 73–74.

"Tuned–Circuit Dual–Mode Johnson Noise Thermometers," by R.L. Shepard et al., Apr. 1992.

"Tuned–Circuit Johnson Noise Thermometry," by Michael Roberts et al., *7th Symposium on Space Nuclear Power Systems*, Jan. 1990.

"Smart Field Devices Provide New Process Data, Increase System Flexibility," by Mark Boland, *I&CS*, Nov. 1994, pp. 45–51.

"Wavelet Analysis of Vibration, Part I: Theory[1]," by D.E. Newland, *Journal of Vibration and Acoustics*, vol. 116, Oct. 1994, pp. 409–416.

"Wavelet Analysis of Vibration, Part 2: Wavelet Maps," by D.E. Newland, *Journal of Vibration and Acoustics*, vol. 116, Oct. 1994, pp. 417–425.

"Development of a Long–Life, High–Reliability Remotely Operated Johnson Noise Thermometer," by R.L. Shepard et al., *ISA*, 1991, pp. 77–84.

"Application of Johnson Noise Thermometry to Space Nuclear Reactors," by M.J. Roberts et al., *Presented at the 6th Symposium on Space Nuclear Power Systems*, Jan. 9–12, 1989.

"A Decade of Progress in High Temperature Johnson Noise Thermometry," by T.V. Blalock et al., *American Institute of Physics*, 1982 pp. 1219–1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29–Aug. 1, 1996, pp. 50–1–50–6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310–314.

"Detecting Blockage in Process Connections of Differential Pressure Transmitters", by E. Taya et al., *SICE*, 1995, pp. 1605–1608.

"Development and Application of Neural Network Algorithms For Process Diagnostics," by B.R. Upadhyaya et al., *Proceedings of the 29th Conference on Decision and Control*, 1990, pp. 3277–3282.

"A Fault–Tolerant Interface for Self–Validating Sensors", by M.P. Henry, *Colloquium*, pp. 3/1–3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1997), pp. 68–88.

"Keynote Paper: Hardware Compilation—A New Technique for Rapid Prototyping of Digital Systems—Applied to Sensor Validation", by M.P. Henry, *Control Eng.Practice*, vol. 3, No. 7., pp. 907–924, (1995).

"The Implications of Digital Communications on Sensor Validation", by M. Henry et al., *Report No. QUEL 1912/92*, (1992).

"In–Situ Response Time Testing of Thermocouples", *ISA*, by H.M. Hashemian et al., Paper No. 89–0056, pp. 587–593, (1989).

"An Integrated Architecture For Signal Validation in Power Plants," by B.R. Upadhyaya et al., *Third IEEE International Symposium on Intelligent Control*, Aug. 24–26, 1988, pp. 1–6.

"Integration of Multiple Signal Validation Modules for Sensor Monitoring," by B. Upadhyaya et al., *Department of Nuclear Engineering*, Jul. 8, 1990, pp. 1–6.

"Intelligent Behaviour for Self–Validating Sensors", by M.P. Henry, *Advances In Measurement*, pp. 1–7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284–L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244–246.

"Neural Networks for Sensor Validation and Plant Monitoring," by B. Upadhyaya, *International Fast Reactor Safety Meeting*, Aug. 12–16, 1990, pp. 2–10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151–162.

"Thermocouple Continuity Checker," IBM Technical Disclosure Bulletin, vol. 20, No. 5, pp. 1954 (Oct. 1977).

"A Self–Validating Thermocouple," Janice C–Y et al., IEEE Transactions on Control Systems Technology, vol. 5, No. 2, pp. 239–253 (Mar. 1997).

*Instrument Engineers' Handbook*, Chapter IV entitled "Temperature Measurements," by T.J. Claggett, pp. 266–333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1–14, Rosemount Inc. (1997).

Warrior, J., "The Collision Between the Web and Plant Floor Automation," $6^{Th}$. WWW Conference Workshop on Embedded Web Technology, Santa Clara, CA (Apr. 7, 1997).

Microsoft Press Computer Dictionary, $3^{rd}$ Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1–58 and 169–204.

"Time–Frequency Analysis of Transient Pressure Signals for a Mechanical Heart Valve Cavitation Study," *ASAIO Journal*, by Alex A. Yu et al., vol. 44, No. 5, pp. M475–M479, (Sep.–Oct. 1998).

"Transient Pressure Signals in Mechanical Heart Valve Caviation," by Z.J. Wu et al., pp. M555–M561, undated.

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED vol. 28, pp. 297–298 (Nov. 6–11, 1994).

"Monitoring and Diagnosis of Cavitation in Pumps and Valves Using the Wigner Distribution," *Hydroaccoustic Facilities, Instrumentation, and Experimental Techniques*, NCA–vol. 10, pp. 31–36 (1991).

"Developing Predictive Models for Cavitation Erosion," *Codes and Standards in A Global Environment*, PVP–vol. 259, pp. 189–192 (1993).

"Self–Diagnosing Intelligent Motors: A Key Enabler for Next Generation Manufacturing System," by Fred M. Discenzo et al., pp. 3/1–3/4 (1999).

"A Microcomputer–Based Instrument for Applications in Platinum Resistance Thermometry," by H. Rosemary Taylor and Hector A. Navarro, Journal of Physics E. Scientific Instrument, vol. 16, No. 11, pp. 1100–1104 (1983).

"Experience in Using Estelle for the Specification and Verification of a Fieldbus Protocol: FIP," by Barretto et al., Computer Networking, pp. 295–304 (1990).

"Computer Simulation of H1 Field Bus Transmission," by Utsumi et al., Advances in Instrumentation and Control, vol. 46, Part 2, pp. 1815–1827 (1991).

"Progress in Fieldbus Developments for Measuring and Control Application," by A. Schwaier, Sensor and Actuators, pp. 115–119 (1991).

"Ein Emulationssystem zur Leistungsanalyse von Feldbussystemen, Teil 1," by R. Hoyer, pp. 335–336 (1991).

"Simulatore Integrato: Controllo su bus di campo," by Barabino et al., Automazione e Strumentazione, pp. 85–91 (Oct. 1993).

"Ein Modulares, verteiltes Diagnose–Expertensystem für die Fehlerdiagnose in lokalen Netzen," by Jürgen M. Schröder, pp. 557–565 (1990).

"Fault Diagnosis of Fieldbus Systems," by Jürgen Quade, pp. 577–581 (10/92).

"Ziele und Anwendungen von Feldbussystemen," by T. Pfeifer et al., pp. 549–557 (10/87).

"PROFIBUS—Infrastrukturmaβnahmen," by Tilo Pfeifer et al., pp. 416–419 (8/91).

"Simulation des Zeitverhaltens von Feldbussystemen," by O. Schnelle, pp. 440–442 (1991).

"Modélisation et simulation d'un bus de terrain: FIP," by Song et al, pp. 5–9, undated.

"Feldbusnetz für Automatisierungssysteme mit intelligenten Funktionseinheiten," by W. Kriesel et al., pp. 486–489 (1987).

"Bus de campo para la inteconexión del proceso con sistemas digitales de control," Tecnología, pp. 141–147 (1990).

"Dezentrale Installation mit Echtzeit–Feldbus," Netzwerke, Jg. Nr.3 v. 14.3, 4 pages (1990).

"Process Measurement and Analysis," by Liptak et al., Instrument Engineers' Handbook, Third Edition, pp. 528–530, (1995).

"Improving Dynamic Performance of Temperature Sensors With Fuzzy Control Techniques," by Wang Lei et al., pp. 872–873 (1992).

"Microsoft Press Computer Dictionary" 2nd Edition, 1994, Microsoft Press. p. 156.

"On–Line Tool Condition Monitoring System With Wavelet Fuzzy Neural Network," by Li Xiaoli et al., pp. 271–276 (1997).

U.S. Appl. No. 09/852,102, filed May 9, 2001, Eryurek et al.

* cited by examiner

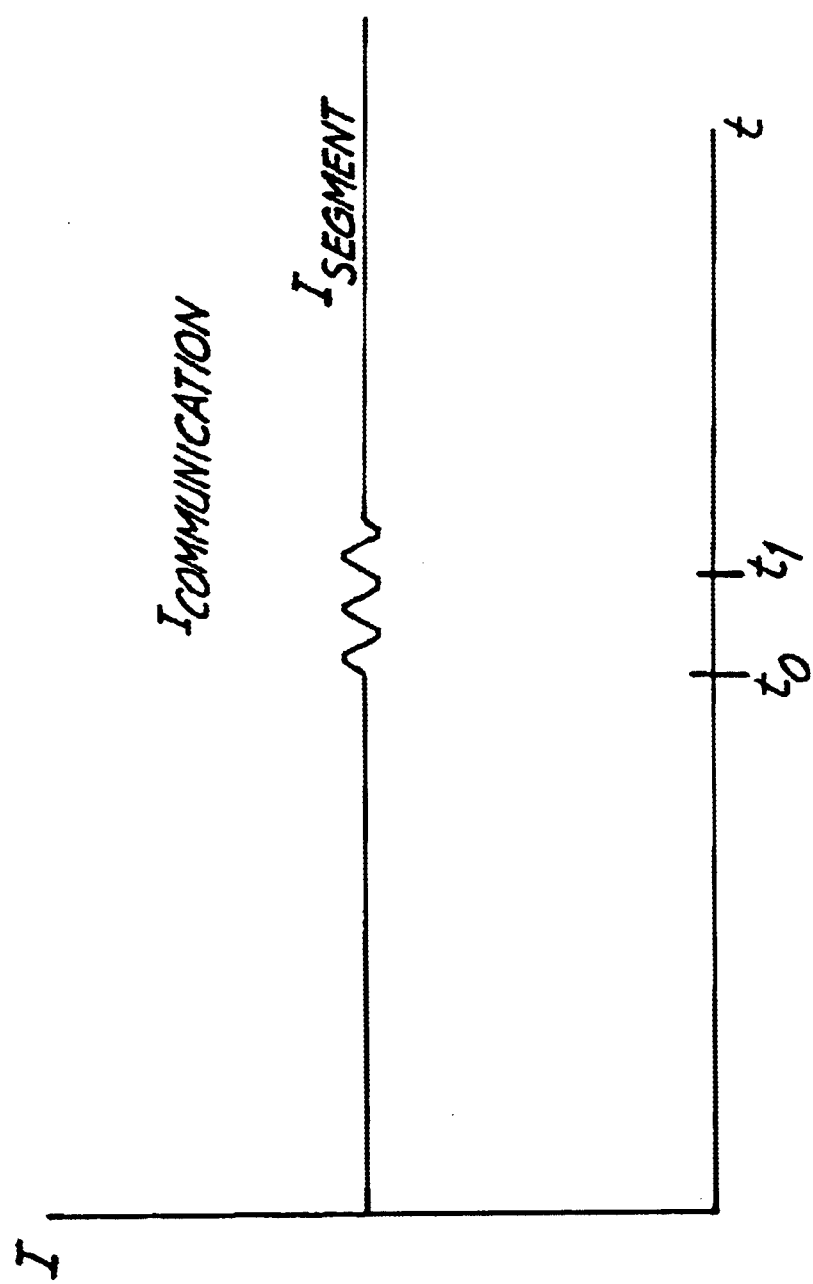

DIAGNOSTICS FOR INDUSTRIAL PROCESS CONTROL AND MEASUREMENT SYSTEMS

BACKGROUND OF THE INVENTION

The present invention relates to field devices operating in the process control and measurement industry. In particular, the present invention relates to field devices with improved diagnostic capabilities.

Field devices, such as process variable transmitters, are used by a number of industries to remotely sense a process variable. A controller may then transmit control information to another field device, such as a valve, in the process to modify a control parameter. For example, information related to pressure of a process fluid may be transmitted to a control room and used to control a valve in an oil refining process. Other examples of a field devices include handheld configuration and/or calibration devices.

One of the relatively recent advances in process control and measurement has been the implementation of all-digital process communication protocols. One example of such an all-digital communication protocol is FOUNDATION Fieldbus. Fieldbus is directed to defining a communication layer or protocol for transmitting information on a process communication loop. The Fieldbus protocol specification is ISA-S50.02-1992, promulgated by the Instrument Society of America in 1992. Fieldbus is a process industry communications protocol described in the Fieldbus technical overview Understanding FOUNDATION™ Fieldbus Technology (1998) available from Rosemount Inc. in Eden Prairie, Minn. As used herein, "fieldbus" is intended to mean any communication protocol operating in accordance with the ISA-S50.02-1992 specification and equivalents thereof, process communication protocols that are backwardly compatible to the ISA-S50.02-1992 protocol, and other standards operating in accordance with International Electrontechnical Commission (IEC) Fieldbus Standard 61158. For example, for the purposes of this patent document, Profibus, ControlNet, P-Net, SwiftNet, WorldFIP and Interbus-S, is considered a fieldbus.

Advantages of fieldbus include relatively high-speed digital communication as well as signaling levels that facilitate compliance with intrinsic safety as set forth in APPROVAL STANDARD INTRINSICALLY SAFE APPARATUS AND ASSOCIATED APPARATUS FOR USE IN CLASS I, II AND III, Division 1, Hazardous (Classified) locations, Class No. 3610, promulgated by Factory Mutual Research, October, 1988. Industrial processing environments that require intrinsic safety compliance provide an added challenge for electrical instrumentation and automation of the process control system since such environments may contain flammable or explosive vapors. Accordingly, process communication loops operating in such processing environments are typically energy-limited. Multiple redundant circuits are used to ensure that energy levels on the communication loop are below a safe energy level so that the energy cannot ignite the flammable vapors, even under fault conditions. Field devices in such environments are also generally energy limited as well. Process communication loops that pass through the safe area of the flammable processing environment to outside equipment such as a controller typically pass through energy limiting barriers such as an intrinsic safety barrier so that a fault occurring outside the flammable environment will not generate a spark inside the frequently explosive fluid processing environment. Process communication loops that have the potential for higher level signals that could spark under fault conditions are often not permitted to pass through or connect to equipment in a flammable processing environment.

In some digital process measurement installations, all field devices communicate over essentially the same digital process communication loop. In such cases, it is much more important to diagnose problems before they become critical and affect the operation of the loop. For example, should a single device fail and begin to draw too much energy, the signaling levels on the process communication loop could collapse thereby inhibiting all communication over the loop and effectively causing the system to fail.

While fieldbus has proved to be an advance in the art of process control and measurement, the nature of its all-digital communication in applications which are relatively intolerant of faults, drives an ongoing need for enhanced diagnostics, not only for the fieldbus devices themselves, but for the process control system in general.

SUMMARY OF THE INVENTION

A field device includes diagnostic circuitry adapted to measure a diagnostic characteristic related to a digital process control and measurement system. The measured characteristic is used to provide a diagnostic output indicative of a condition of the digital process control and measurement system by comparing it to predicted or anticipated characteristics developed by models or historical data. Depending on the difference between the measured characteristic and the predicted characteristic, faults and/or deterioration in the process can be detected, depending on the type of characteristic monitored.

BRIEF DESCRIPTION OF THE DRAWINGS

FIG. 5 is a chart of current versus time for a fieldbus device.

DETAILED DESCRIPTION OF THE ILLUSTRATIVE EMBODIMENTS

Figure 1:
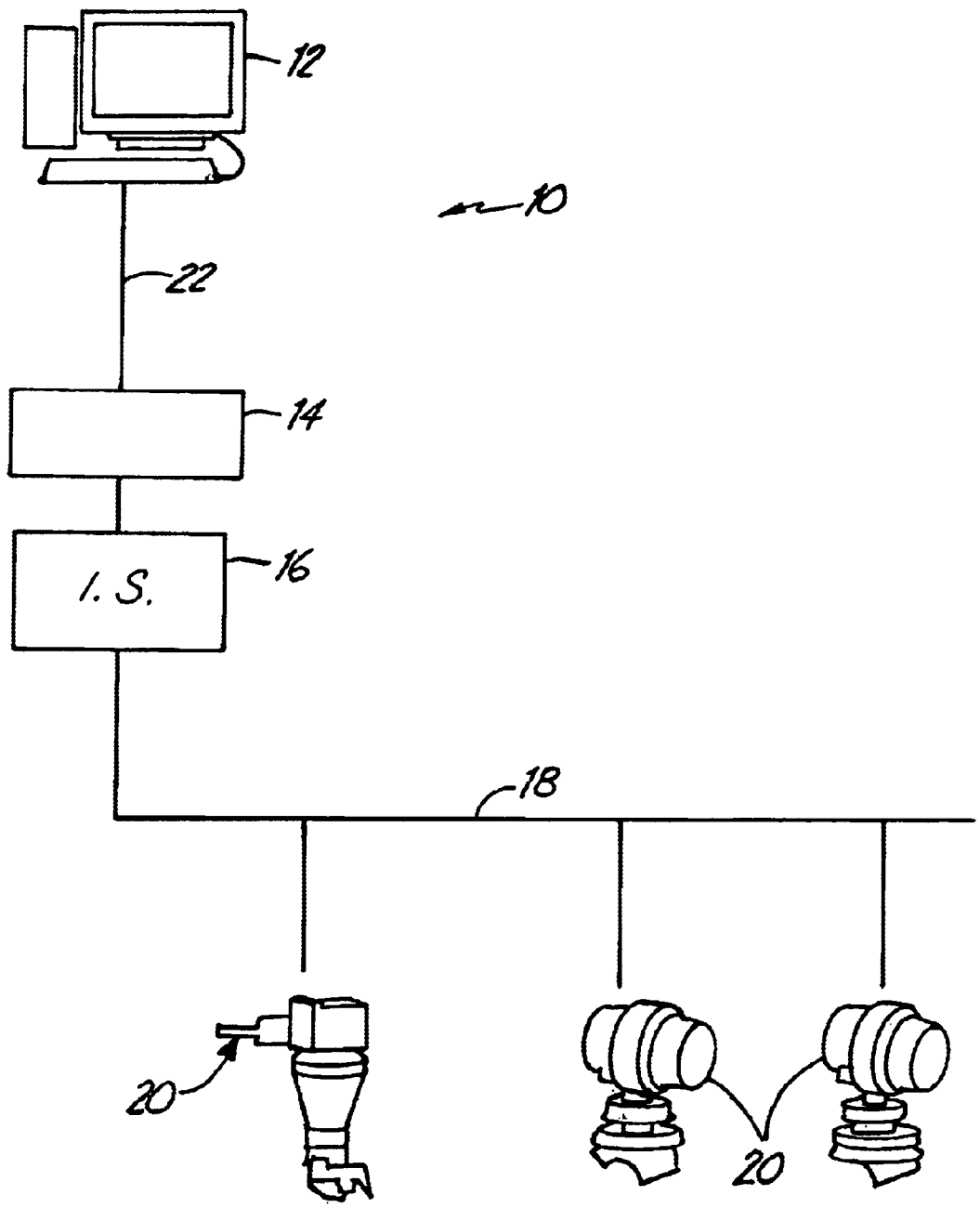
FIG. 1 is a system block diagram of a process control and measurement system.

FIG. 1 illustrates an exemplary system in which embodiments of the present invention are useful. System 10 includes controller 12, I/O and control sub-system 14, intrinsic safety (IS) barrier 16, process communication loop 18 and field devices 20. Controller 12 is coupled to I/O and control sub-system 14 via link 22 which can be any suitable link such as a local area network (LAN) operating in accordance with Ethernet signaling protocols or any other suitable protocol. I/O and control sub-system 14 is coupled to intrinsic safety barrier 16 which in turn is coupled to process communication loop 18 to allow data communication between loop 18 and I/O and control sub-system 14 in a manner that limits energy passing therethrough.

Process communication loop 18 is a fieldbus process communication loop and is coupled to field devices 20, which are shown coupled to process communication loop 18 in a multi-drop configuration. The illustrated multi-drop wiring configuration vastly simplifies system wiring compared to other topologies such as the star topology.

Figure 2:
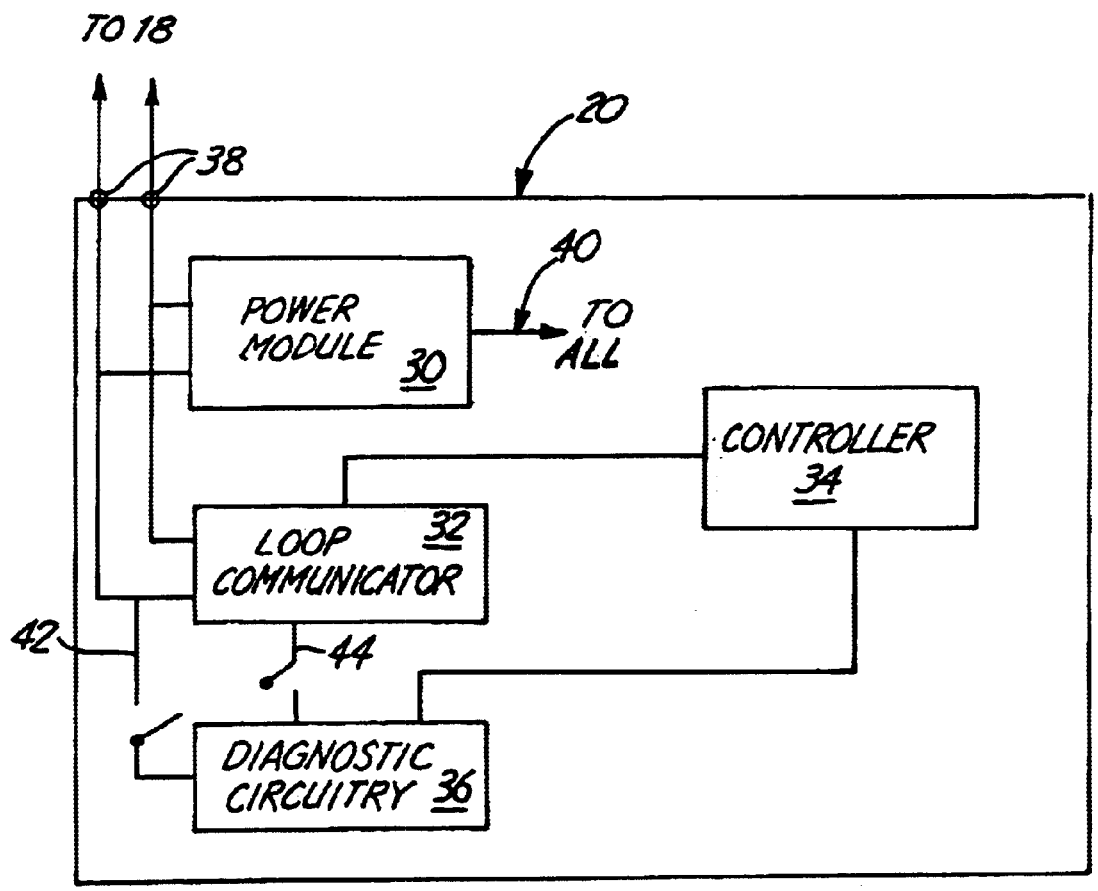
FIG. 2 is a system block diagram of a field device incorporating diagnostic circuitry in accordance with an embodiment of the present invention.

FIG. 2 is a system block diagram of field device 20 in accordance with an embodiment of the present invention. Device 20 includes power module 30, fieldbus loop communicator 32, controller 34, and diagnostic circuitry 36. The power module 30 and fieldbus loop communicator 32 are coupled to process communication loop 18 (not shown) via terminals 38 (two of which are shown). Power module 30 receives electrical energy from process communication loop 18 and provides power to all components of field device 20 as indicated by arrow 40 labeled "to all".

Fieldbus loop communicator 32 is adapted for digitally communicating over process communication loop 18 via terminals 38. For example, if process communication loop 18 operates in accordance with the FOUNDATION™ fieldbus protocol, fieldbus loop communicator 32 is similarly adapted for FOUNDATION™ fieldbus communication. Loop communicator 32 receives process communication signals over loop 18 and provides process communication data based upon such signals to controller 34. Conversely, controller 34 can provide data to loop communicator 32 which is then transformed into suitable process communication signals for transmission over process communication loop 18.

Diagnostic circuitry 36 is coupled to controller 34 and to process communication loop 18 as indicated by broken line 42. Additionally, diagnostic circuitry 36 is also operably coupled to loop communicator 32 via broken line 44. As will be described in greater detail later in the specification, couplings 42, 44 may be direct couplings or indirect couplings. As used herein, a "direct coupling" is intended to mean any diagnostic circuit that electrically couples to a circuit of interest to measure a parameter thereof. Conversely, "indirect coupling" is intended to mean any diagnostic circuit that measures a parameter of a circuit of interest without electrically coupling to the circuit of interest. Couplings 42 and 44 operate to allow diagnostic circuitry 36 to sample characteristics of loop 18 (via coupling 42) and loop data (via coupling 44).

Diagnostic circuitry 36 measures a number of parameters related to digital process communication loop 18 via coupling 42. By measuring various voltages and currents on the digital loop 18, these various parameters can be ascertained or otherwise derived. Preferably, the voltages are measured by an analog-to-digital converter within diagnostic circuitry 36 and a digital signal is then passed to controller 34. Examples of loop related measurements include, without limitation:

instantaneous DC voltage level on the loop;
long-term variation of the loop DC voltage;
instantaneous currents being drawn from the loop by the field device;
long-term variation of the current drawn from the loop by the field device;
peak-to-peak communications signal strength of the messages on the loop and identification by Tag device address, etc., as to which device has which signal strength (these measurements also include those message transmissions from field device 20 itself);
the lowest signal source on the loop and its device ID and address;
the quiescent noise level on the loop; and
the characteristic impedance of the loop.

The above-listed individual loop parameters each provide an indication of system viability. For example, measuring long-term variation of the loop DC voltage allows field device 20 to detect a relatively slow voltage drop over time that would have otherwise gone undetected and which drop indicates a degradation in the process communication loop. By measuring peak-to-peak communication signal strength, indications of proper installation, proper number of bus terminators, proper wire type and correct network termination are provided. Although the above-listed network-related measurements are set forth individually, it is expressly contemplated that additional diagnostic information can be ascertained by combining various measurements, and/or performing trend analyses on the individual or combined measurements. Diagnostic circuitry 36 can predict device failure based upon trending of all or some of the above-mentioned parameters. The diagnostic information can be essentially "pushed" through the system to a Computerized Maintenance Management System (CMMS) for maintenance work orders. Additionally, the diagnostic information can be selected to alert an operator of the control system to change control strategies.

As illustrated in FIG. 2, diagnostic circuitry 36 can be coupled to fieldbus loop communicator 32 such that diagnostic circuitry 36 has access to data communicated through fieldbus loop communicator 32. In this regard, diagnostic circuitry 36 is able to ascertain a number of protocol-related attributes. Such attributes include, without limitation:

the number of devices on the loop;
frequency monitoring of Cyclic Redundancy Checks (CRC) which informs the operator of the frequency of CRC errors and whether such frequency indicates an imminent criticality;
loop performance data such as token rotation time; and
identification of the present Link Active Scheduler (LAS).

Finally, diagnostic circuitry 36 can also provide quiescent current and voltage rail monitoring of the device electronics of field device 20 in order to indicate the continued health, or otherwise, of the electronics within field device 20.

Figure 3:
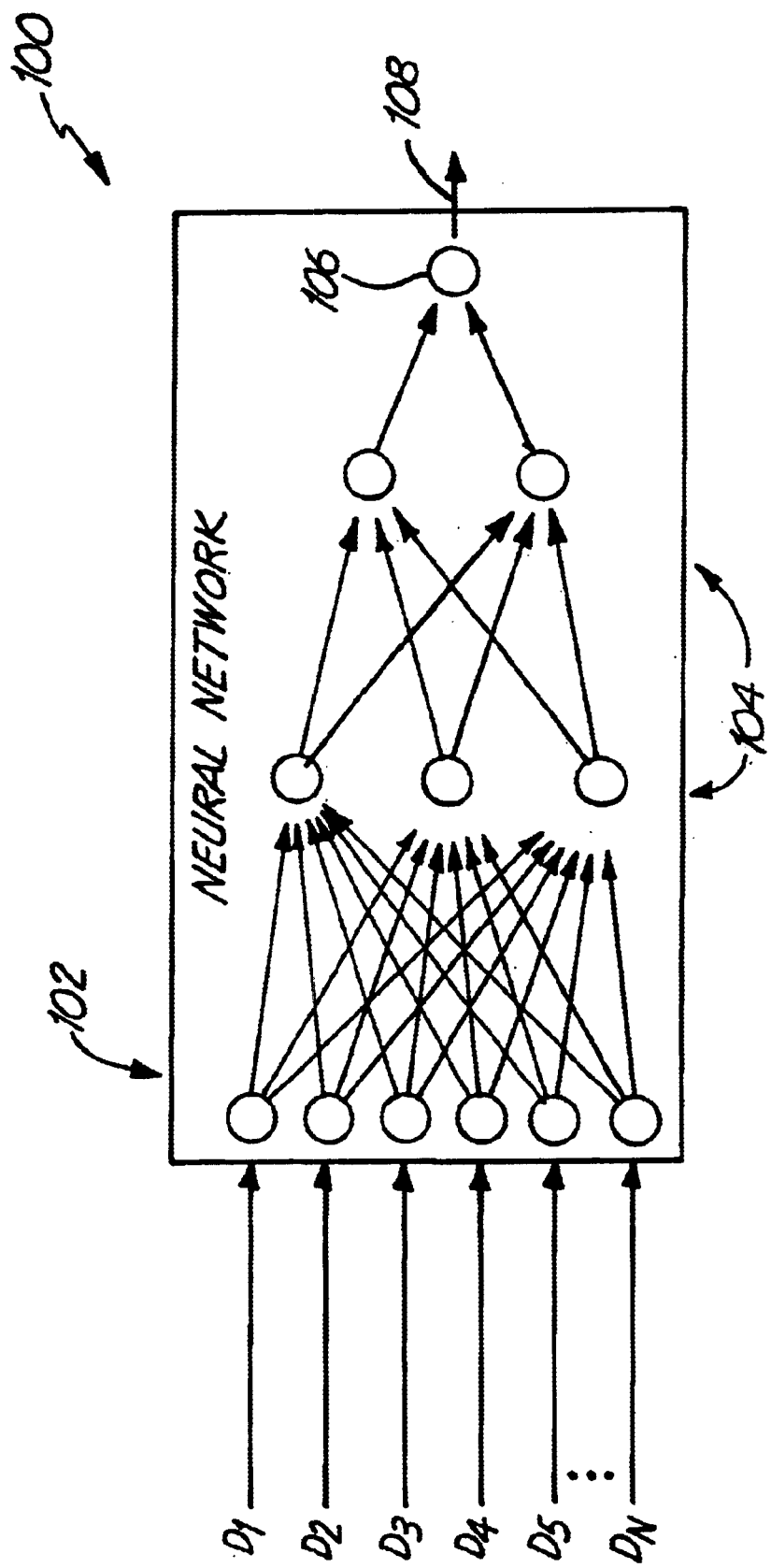
FIG. 3 is a diagrammatic illustration of an analytical module useful with embodiments of the present invention.

Any of the above individual or combined measurements themselves provide valuable diagnostic data for the digital process control and measurement system. Such diagnostic data may allow earlier detection of problems with the process communication loop, or devices on the process communication loop such that remedial action may be taken earlier and thus, failure averted. However, additional analyses of the measured diagnostic information provide additional information about the process control and measurement system. Such additional diagnostic calculations and analysis are generally performed by controller 34 which can include a microprocessor. In one embodiment, software in memory (not shown) within controller 34 is used to implement a neural network in controller 34 such as neural network 100 illustrated in FIG. 3. Neural networks are generally known, and network 100 can be trained using known training algorithms such as the back propagation network (BPN) to develop the neural network module. The networks includes input nodes 102, hidden nodes 104 and output nodes 106. Various data measurements $D_1$ through $D_n$ are provided as inputs to the input nodes 102 which act as an input buffer. The input nodes 102 modify the received data by various ways in accordance with a training algorithm and the outputs are provided to the hidden nodes 104. The hidden layer 104 is used to characterize and analyze a non-linear property of the diagnostic information. The last layer, output layer 106, provides an output 108 that is an indication of diagnostic information related to process control and measurement.

The neural network 100 can be trained either through modeling or empirical techniques which are known in the art and in which actual process communication signals and information sensors are used to provide training input to neural network 100.

Another technique for analyzing the diagnostic data provided by diagnostic circuitry 36 is through the use of a rule-based system in which controller 34 stores rules, expected results and sensitivity parameters.

Another analysis technique is fuzzy logic. For example, fuzzy logic algorithms can be employed on the data measurements $D_1$ through $D_n$ prior to their input into neural network 100. Additionally, neural network 100 can implement a fuzzy-node algorithm in which the various neurons of the network implement fuzzy algorithms. The various analysis techniques can be used alone or in combinations. Additionally, other analysis techniques are considered within the scope of the present invention.

Figure 4:
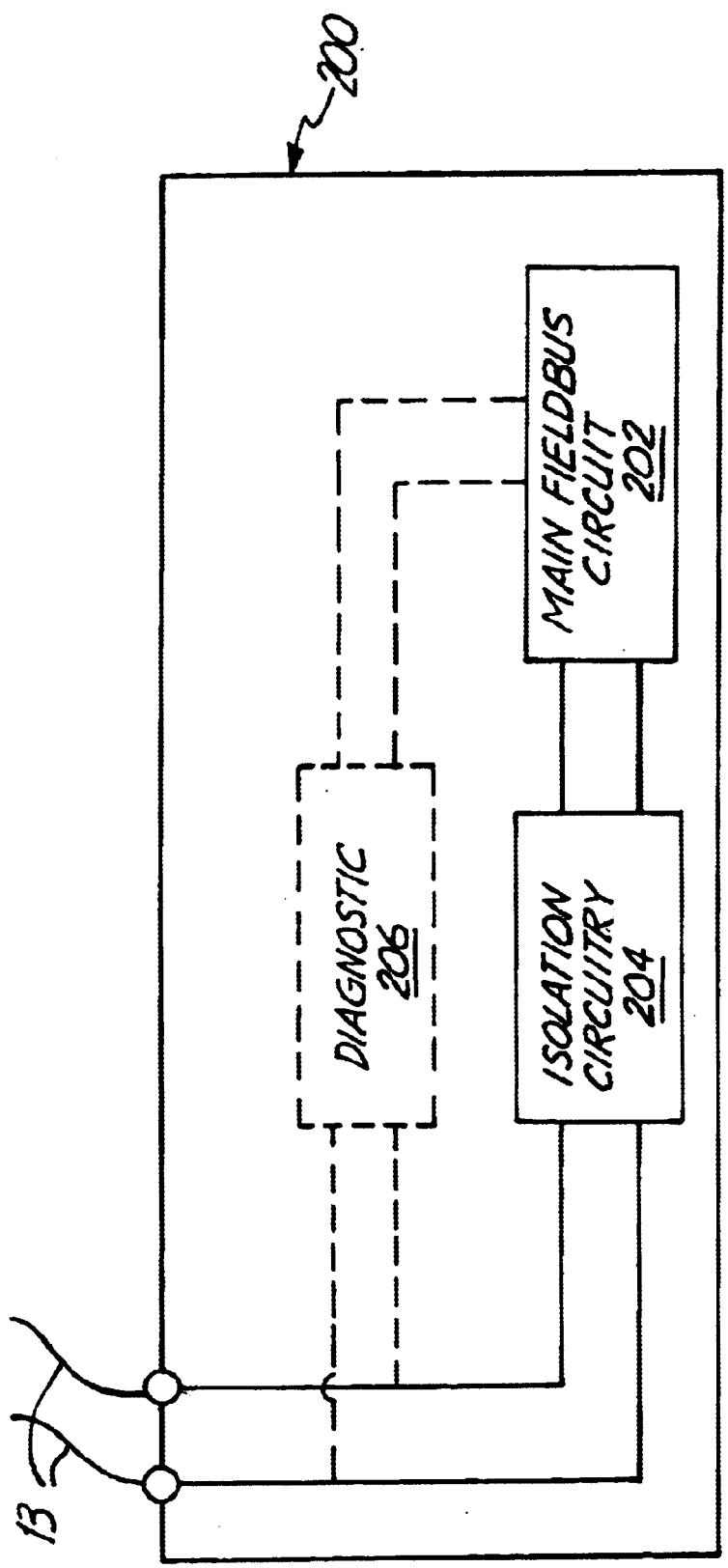
FIG. 4 is a system block diagram of a field device illustrating a technical challenge of obtaining diagnostic information for intrinsically safe embodiments of the present invention.

As noted above, intrinsically safe applications provide an additional hurdle for obtaining the diagnostic information discussed above. FIG. 4 is a block diagram of a field device 200 illustrating the challenge of obtaining diagnostic information for an intrinsically safe field device. Field device 200, like field device 20, includes isolation circuitry (not shown in FIG. 2) that is electrically interposed between digital process communication loop 18, and device circuitry 202. Isolation circuitry 204 functions similarly to intrinsic safety barrier 16 described with respect to FIG. 1 in that it limits the amount of energy that can pass onto process communication loop 18. As described above, a number of diagnostic parameters are obtained by measuring the voltage on process communication loop 18. Thus, one would be tempted to couple diagnostic circuitry 36 directly to loop 18. However, in intrinsically safe applications, such direct coupling bypasses isolation circuitry 204 and thus, creates a duplicate path where unlimited energy could pass from circuit 202 onto loop 18 and potentially generate a spark. Thus, if diagnostic circuitry 206 is to be coupled directly to loop 18, it must include its own isolation circuitry. Such additional isolation circuitry adds to unit costs, consumes additional power and takes up additional board space within the field device. However, as can be appreciated, in order to directly measure network or loop characteristics in an intrinsically safe environment, such additional isolation circuitry is required.

Another way of obtaining diagnostic information related to process communication loop 18 is via indirect methods. As mentioned above, indirect methods of measuring a parameter of interest do so without electrically coupling to the circuit of interest. In fieldbus, each device draws a substantially constant current $I_{segment}$ and operates on a voltage between about 9 volts and about 32 volts DC. Fieldbus communication signaling is effected by causing the device to modulate the current drawn and thereby communicate. FIG. 5 illustrates current versus time $I_{rst}$ for a typical fieldbus installation. For most of the time, the current I is equal to $I_{segment}$. However, between time $t_0$ and $t_1$, the current shifts rapidly while fieldbus communication occurs. The communication current is labeled $I_{Communication}$. As can be seen, $I_{communication}$ is substantially centered about $I_{segment}$ and thus has a DC current of approximately zero. Those skilled in the art will appreciate that the power drawn by a fieldbus device is generally equal to $I_{segment}$ times the loop voltage (which generally ranges between 9 VDC and 32 VDC, but which is substantially constant for a given installation). The fieldbus signaling circuitry emanates heat and thus operates at an elevated temperature that is related to the fieldbus power and the thermal resistance of the fieldbus signaling circuitry. Once the design of the fieldbus signaling circuitry is complete, the thermal resistance is substantially constant. Thus, the operating temperature of the fieldbus signaling circuitry is proportional to the power of the fieldbus device. Since $I_{segment}$ is substantially constant, the temperature of the fieldbus signaling circuitry can be considered to operate at an elevated temperature that is roughly proportional to the loop voltage. Thus, sensing temperature of such fieldbus signaling circuitry provides an indication of loop voltage. Preferably, such sensing is done in the form of a temperature sensor disposed on the circuit board in relatively close proximity to the fieldbus signaling circuitry such that heat emanating from the signaling circuitry is sensed by the temperature sensor. The temperature sensor can be a thermocouple, thermistor, resistance temperature device (RTD), or any other suitable temperature sensing element. The measured temperature is then used to compute loop voltage and thus provides an indirect measurement of a diagnostic parameter.

Although the present invention has been described with reference to preferred embodiments, workers skilled in the art will recognize that changes may be made in form and detail without departing from the spirit and scope of the invention.

What is claimed is:

1. A field device coupleable to a fieldbus process communication loop, the device comprising;
   a power module coupleable to the loop to power the device with energy received from the loop;
   a loop communicator coupleable to the loop, and adapted to bi-directionally communicate over the loop;
   a controller coupled to the loop communicator;
   diagnostic circuitry coupled to the controller and operably coupleable to the loop, the diagnostic circuitry adapted to measure a loop-related parameter including long term variation of DC voltage; and
   wherein the controller provides diagnostic information based upon the loop-related parameter.

2. The field device of claim 1 wherein the fieldbus process communication loop is selected from the group consisting of FOUNDATION™ fieldbus (H1), Profibus™, ControlNet, P-Net, SwiftNet, WorldFIP, Interbus-S, and FOUNDATION™ Fieldbus High-Speed Ethernet (H2).

3. The field device of claim 1 wherein the diagnostic circuitry further comprises an intrinsic safety barrier and wherein the diagnostic circuitry is coupleable directly to the fieldbus process communication loop.

4. The field device of claim 1, wherein the diagnostic circuitry is indirectly coupleable to the fieldbus process communication loop.

5. The device of claim 4, wherein the diagnostic circuitry includes a temperature sensor adapted to provide a signal related to temperature of a fieldbus communication circuit in the field device.

6. The device of claim 1, wherein the controller executes a neural network analysis of the loop-related parameter to provide the diagnostic signal.

7. The device of claim 1, wherein the controller executes fuzzy logic upon the loop-related parameter to provide the diagnostic signal.

8. The device of claim 1, wherein the diagnostic circuitry measures a plurality of loop-related parameters, and wherein the controller provides a diagnostic signal based upon a combination of the loop-related parameters.

9. The field device of claim 1 wherein the diagnostic circuitry is adapted to measure a plurality of loop-related parameters and provide failure prediction based upon the plurality of loop-related parameters.

10. A method of providing diagnostics on a fieldbus process communication loop, the method comprising:
   indirectly coupling diagnostic circuitry to the fieldbus process communication loop;
   measuring a parameter of the loop; and
   analyzing the parameter to provide a diagnostic output.

11. The method of claim 10 wherein analyzing the parameter includes performing a neural network analysis on the measured parameter.

12. The method of claim 10, wherein analyzing the parameter further includes performing fuzzy logic upon the measured parameter.

13. The method of claim 10, wherein analyzing the parameter includes performing fuzzy logic upon the measured parameter to provide the diagnostic output.

14. The method of claim 10, wherein operably coupling diagnostic circuitry to the loop includes operably coupling the diagnostic circuitry to the loop via a loop communicator to allow the diagnostic circuitry to access data communicated by the loop communicator.

15. The method of claim 10 wherein analyzing the parameter to provide a diagnostic output further comprises applying a least squares method analysis to the measured parameter.

16. A field device coupleable to a fieldbus process communication loop, the device comprising;
   a power module coupleable to the loop to power the device with energy received from the loop;
   a loop communicator coupleable to the loop, and adapted to bi-directionally communicate over the loop;
   a controller coupled to the loop communicator;
   diagnostic circuitry coupled to the controller and operably coupleable to the loop, the diagnostic circuitry adapted to measure a loop-related parameter including long term variation of current drawn by the field device; and
   wherein the controller provides diagnostic information based upon the loop-related parameter.

17. A field device coupleable to a fieldbus process communication loop, the device comprising;
   a power module coupleable to the loop to power the device with energy received from the loop;
   a loop communicator coupleable to the loop, and adapted to bi-directionally communicate over the loop;
   a controller coupled to the loop communicator;
   diagnostic circuitry coupled to the controller and operably coupleable to the loop, the diagnostic circuitry adapted to measure a loop-related parameter including a lowest signal source on the loop and a device ID and address of the lowest signal source; and
   wherein the controller provides diagnostic information based upon the loop-related parameter.

18. A field device coupleable to a fieldbus process communication loop, the device comprising;
   a power module coupleable to the loop to power the device with energy received from the loop;
   a loop communicator coupleable to the loop, and adapted to bi-directionally communicate over the loop;
   a controller coupled to the loop communicator;
   diagnostic circuitry coupled to the controller and operably coupleable to the loop, the diagnostic circuitry adapted to measure a loop-related parameter including a quiescent noise level on the loop; and
   wherein the controller provides diagnostic information based upon the loop-related parameter.

19. A field device coupleable to a fieldbus process communication loop, the device comprising;
   a power module coupleable to the loop to power the device with energy received from the loop;
   a loop communicator coupleable to the loop, and adapted to bi-directionally communicate over the loop;
   a controller coupled to the loop communicator;
   diagnostic circuitry coupled to the controller and operably coupleable to the loop, the diagnostic circuitry adapted to measure a loop-related parameter;
   wherein the controller provides diagnostic information based upon the loop-related parameter;
   wherein the diagnostic information is indicated from the loop communicator to a computerized maintenance management system for work orders; and
   wherein the diagnostic information is selected to alert an operator to change control strategies.

* * * * *

UNITED STATES PATENT AND TRADEMARK OFFICE
CERTIFICATE OF CORRECTION

PATENT NO.      : 6,859,755 B2
DATED           : February 22, 2005
INVENTOR(S)     : Eryurek et al.

It is certified that error appears in the above-identified patent and that said Letters Patent is hereby corrected as shown below:

Title page,
Item [75], Inventors, "Gregory H. Rome, Fridley, MN (US)" should be -- Gregory H. Rome, Woodbury, MN (US) -- "Weston R. Roper, St. Louis Park, MN (US)" should be -- Weston R. Roper, Shakopee, MN (US) --
Item [56], References Cited, U.S. PATENT DOCUMENTS, delete reference "6,466,89"
insert:

| | | | | |
|---|---|---|---|---|
| 4,668,473 | 05/26/86 | Agarwal | 422 | 62 |
| 6,016,523 | 01/18/00 | Zimmerman et al. | 710 | 63 |
| 6,052,655 | 04/18/00 | Kobayashi et al. | 702 | 184 |
| 3,855,858 | 12/24/74 | Cushing | 73 | 194 EM |
| 5,388,465 | 02/14/95 | Okaniwa et al. | 73 | 861.17 |
| 5,560,246 | 10/01/96 | Bottinger et al. | 73 | 861.15 |
| 6,014,902 | 01/18/00 | Lewis et al. | 73 | 861.12 |
| 5,880,376 | 03/09/99 | Sai et al. | 73 | 861.08 |
| 6,038,579 | 03/14/00 | Sekine | 708 | 400 |
| Re.29,383 | 09/06/77 | Gallatin et al. | 137 | 14 |
| 3,096,434 | 07/02/63 | King | 235 | 151 |
| 3,404,264 | 10/01/68 | Kugler | 235 | 194 |
| 3,468,164 | 09/23/69 | Sutherland | 73 | 343 |
| 3,590,370 | 06/29/71 | Fleischer | 324 | 51 |
| 3,688,190 | 08/29/72 | Blum | 324 | 61R |
| 3,691,842 | 09/19/72 | Akeley | 73 | 398C |
| 3,701,280 | 10/31/72 | Stroman | 73 | 194 |
| 3,973,184 | 08/03/76 | Raber | 324 | 51 |
| 4,058,975 | 11/22/77 | Gilbert et al. | 60 | 39.28 |
| 4,099,413 | 07/11/78 | Ohte et al. | 73 | 359 |
| 4,102,199 | 07/25/78 | Talpouras | 73 | 362 |
| 4,122,719 | 10/31/78 | Carlson et al. | 73 | 342 |
| 4,250,490 | 02/10/81 | Dahlke | 340 | 870.37 |
| 4,337,516 | 06/29/82 | Murphy et al. | 364 | 551 |
| 4,517,468 | 05/14/85 | Kemper et al. | 290 | 52 |
| 4,530,234 | 07/23/85 | Cullick et al. | 73 | 53 |
| 4,571,689 | 02/18/86 | Hildebrand et al. | 364 | 481 |
| 4,635,214 | 01/06/87 | Kasai et al. | 364 | 551 |
| 4,642,782 | 02/10/87 | Kemper et al. | 364 | 550 |

UNITED STATES PATENT AND TRADEMARK OFFICE
CERTIFICATE OF CORRECTION

PATENT NO. : 6,859,755 B2
DATED : February 22, 2005
INVENTOR(S) : Eryurek et al.

It is certified that error appears in the above-identified patent and that said Letters Patent is hereby corrected as shown below:

Title page (cont'd),

| | | | | |
|---|---|---|---|---|
| 4,644,479 | 02/17/87 | Kemper et al. | 364 | 550 |
| 4,649,515 | 03/10/87 | Thompson et al. | 364 | 900 |
| 4,707,796 | 11/17/87 | Calabro et al. | 364 | 552 |
| 4,736,367 | 05/05/88 | Wroblewski et al. | 370 | 85 |
| 4,777,585 | 10/11/88 | Kokawa et al. | 364 | 164 |
| 4,831,564 | 05/16/89 | Suga | 364 | 551.01 |
| 4,841,286 | 06/20/89 | Kummer | 340 | 653 |
| 4,873,655 | 10/10/89 | Kondraske | 364 | 553 |
| 4,907,167 | 03/06/90 | Skeirik | 364 | 500 |
| 4,924,418 | 05/08/90 | Backman et al. | 364 | 550 |
| 4,934,196 | 06/19/90 | Romano | 73 | 861.38 |
| 4,939,753 | 07/03/90 | Olson | 375 | 107 |
| 4,964,125 | 10/16/90 | Kim | 371 | 15.1 |
| 4,988,990 | 01/29/91 | Warrior | 340 | 25.5 |
| 4,992,965 | 02/12/91 | Holter et al. | 364 | 551.01 |
| 5,005,142 | 04/02/91 | Lipchak et al. | 364 | 550 |
| 5,043,862 | 08/27/91 | Takahashi et al. | 364 | 162 |
| 5,053,815 | 10/01/91 | Wendell | 355 | 208 |
| 5,067,099 | 11/19/91 | McCown et al. | 364 | 550 |
| 5,081,598 | 01/14/92 | Bellows et al. | 364 | 550 |
| 5,089,984 | 02/18/92 | Struger et al. | 395 | 650 |
| 5,098,197 | 03/24/92 | Shepard et al. | 374 | 120 |
| 5,099,436 | 03/24/92 | McCown et al. | 364 | 550 |
| 5,103,409 | 04/07/92 | Shimizu et al. | 364 | 556 |
| 5,111,531 | 05/05/92 | Grayson et al. | 395 | 23 |
| 5,121,467 | 06/09/92 | Skeirik | 395 | 11 |
| 5,122,794 | 06/16/92 | Warrior | 340 | 825.2 |
| 5,122,976 | 06/16/92 | Bellows et al. | 364 | 550 |
| 5,130,936 | 07/14/92 | Sheppard et al. | 364 | 551.01 |
| 5,134,574 | 07/28/92 | Beaverstock et al. | 364 | 551.01 |
| 5,137,370 | 08/11/92 | McCullock et al. | 374 | 173 |
| 5,142,612 | 08/25/92 | Skeirik | 395 | 11 |
| 5,143,452 | 09/01/92 | Maxedon et al. | 374 | 170 |
| 5,148,378 | 09/15/92 | Shibayama et al. | 364 | 551.07 |
| 5,167,009 | 11/24/92 | Skeirik | 395 | 27 |

UNITED STATES PATENT AND TRADEMARK OFFICE
CERTIFICATE OF CORRECTION

PATENT NO.      : 6,859,755 B2
DATED           : February 22, 2005
INVENTOR(S)     : Eryurek et al.

It is certified that error appears in the above-identified patent and that said Letters Patent is hereby corrected as shown below:

Title page (cont'd),

| | | | | |
|---|---|---|---|---|
| 5,175,678 | 12/29/92 | Frerichs et al. | 364 | 148 |
| 5,193,143 | 03/09/93 | Kaemmerer et al. | 395 | 51 |
| 5,197,114 | 03/23/93 | Skeirik | 395 | 22 |
| 5,197,328 | 03/30/93 | Fitzgerald | 73 | 168 |
| 5,212,765 | 05/18/93 | Skeirik | 395 | 11 |
| 5,214,582 | 05/25/93 | Gray | 364 | 424.03 |
| 5,224,203 | 06/29/93 | Skeirik | 395 | 22 |
| 5,228,780 | 07/20/93 | Shepard et al. | 374 | 175 |
| 5,235,527 | 08/10/93 | Ogawa et al. | 364 | 571.05 |
| 5,265,031 | 11/23/93 | Malczewski | 364 | 497 |
| 5,265,222 | 11/23/93 | Nishiya et al. | 395 | 3 |
| 5,274,572 | 12/28/93 | O'Neill et al. | 364 | 550 |
| 5,282,131 | 01/25/94 | Rudd et al. | 364 | 164 |
| 5,282,261 | 01/25/94 | Skeirik | 395 | 22 |
| 5,293,585 | 03/08/94 | Morita | 395 | 52 |
| 5,303,181 | 04/12/94 | Stockton | 365 | 96 |
| 5,305,230 | 04/19/94 | Matsumoto et al. | 364 | 495 |
| 5,311,421 | 05/10/94 | Nomura et al. | 364 | 157 |
| 5,317,520 | 05/31/94 | Castle | 364 | 482 |
| 5,327,357 | 07/05/94 | Feinstein et al. | 364 | 502 |
| 5,333,240 | 07/26/94 | Matsumoto et al. | 395 | 23 |
| 5,349,541 | 09/20/94 | Alexandro, Jr. et al. | 364 | 578 |
| 5,357,449 | 10/18/94 | Oh | 364 | 551.01 |
| 5,361,628 | 11/08/94 | Marko et al. | 73 | 116 |
| 5,365,423 | 11/15/94 | Chand | 364 | 140 |

UNITED STATES PATENT AND TRADEMARK OFFICE
CERTIFICATE OF CORRECTION

PATENT NO.    : 6,859,755 B2
DATED         : February 22, 2005
INVENTOR(S)   : Eryurek et al.

It is certified that error appears in the above-identified patent and that said Letters Patent is hereby corrected as shown below:

<u>Title page (cont'd),</u>

| | | | | |
|---|---|---|---|---|
| 5,367,612 | 11/22/94 | Bozich et al. | 395 | 22 |
| 5,384,699 | 01/24/95 | Levy et al. | 364 | 413.13 |
| 5,386,373 | 01/31/95 | Keeler et al. | 364 | 577 |
| 5,394,341 | 02/28/95 | Kepner | 364 | 551.01 |
| 5,394,543 | 02/28/95 | Hill et al. | 395 | 575 |
| 5,404,064 | 04/04/95 | Mermelstein et al. | 310 | 319 |
| 5,408,406 | 04/18/95 | Mathur et al. | 364 | 163 |
| 5,408,586 | 04/18/95 | Skeirik | 395 | 23 |
| 5,414,645 | 05/09/95 | Hirano | 364 | 551.01 |
| 5,419,197 | 05/30/95 | Ogi et al. | 73 | 659 |
| 5,430,642 | 07/04/95 | Nakajima et al. | 364 | 148 |
| 5,440,478 | 08/08/95 | Fisher et al. | 364 | 188 |
| 5,442,639 | 08/15/95 | Crowder et al. | 371 | 20.1 |
| 5,467,355 | 11/14/95 | Umeda et al. | 364 | 571.04 |
| 5,469,070 | 11/21/95 | Koluvek | 324 | 713 |
| 5,469,156 | 11/21/95 | Kogura | 340 | 870.38 |
| 5,469,735 | 11/28/95 | Watanabe | 73 | 118.1 |
| 5,481,199 | 01/02/96 | Anderson et al. | 324 | 705 |
| 5,483,387 | 01/09/96 | Bauhahn et al. | 359 | 885 |
| 5,485,753 | 01/23/96 | Burns et al. | 73 | 720 |
| 5,486,996 | 01/23/96 | Samad et al. | 364 | 152 |
| 5,488,697 | 01/30/96 | Kaemmerer et al. | 395 | 51 |
| 5,489,831 | 02/06/96 | Harris | 318 | 701 |
| 5,495,769 | 05/03/96 | Borden et al. | 73 | 718 |
| 5,510,779 | 04/23/96 | Maltby et al. | 340 | 870.300 |
| 5,511,004 | 04/23/96 | Dubost et al. | 364 | 551.01 |
| 5,548,528 | 08/20/96 | Keeler et al. | 364 | 497 |
| 5,561,599 | 10/01/96 | Lu | 364 | 164 |
| 5,570,300 | 10/29/96 | Henry et al. | 364 | 551.01 |
| 5,572,420 | 11/05/96 | Lu | 364 | 153 |
| 5,573,032 | 11/12/96 | Lenz et al. | 137 | 486 |
| 5,598,521 | 01/28/97 | Kilgore et al. | 395 | 326 |
| 5,600,148 | 02/04/97 | Cole et al. | 250 | 495.1 |
| 5,623,605 | 04/22/97 | Keshav et al. | 395 | 200.17 |
| 5,640,491 | 06/17/97 | Bhat et al. | 395 | 22 |
| 5,661,668 | 08/26/97 | Yemini et al. | 364 | 550 |
| 5,665,899 | 07/09/97 | Willcox | 73 | 1.63 |
| 5,671,335 | 09/23/97 | Davis et al. | 395 | 23 |

UNITED STATES PATENT AND TRADEMARK OFFICE
CERTIFICATE OF CORRECTION

PATENT NO. : 6,859,755 B2
DATED : February 22, 2005
INVENTOR(S) : Eryurek et al.

It is certified that error appears in the above-identified patent and that said Letters Patent is hereby corrected as shown below:

Title page (cont'd),

| | | | | |
|---|---|---|---|---|
| 5,675,504 | 10/07/97 | Serodes et al. | 364 | 496 |
| 5,675,724 | 10/07/97 | Beal et al. | 395 | 182.02 |
| 5,704,011 | 12/30/97 | Hansen et al. | 395 | 22 |
| 5,705,978 | 01/06/98 | Frick et al. | 340 | 511 |
| 5,708,585 | 01/13/98 | Kushion | 364 | 431.061 |
| 5,713,668 | 02/03/98 | Lunghofer et al. | 374 | 179 |
| 5,742,845 | 04/21/98 | Wagner | 395 | 831 |
| 5,746,511 | 05/05/98 | Eryurek et al. | 374 | 2 |
| 5,752,008 | 05/12/98 | Bowling | 395 | 500 |
| 5,764,891 | 06/09/98 | Warrior | 395 | 200.2 |
| 5,781,878 | 07/14/98 | Mizoguchi et al. | 701 | 109 |
| 5,801,689 | 09/01/98 | Huntsman | 345 | 329 |
| 5,805,442 | 09/08/98 | Crater et al. | 364 | 138 |
| 5,828,567 | 10/27/98 | Eryurek et al. | 700 | 79 |
| 5,859,964 | 01/12/99 | Wang et al. | 395 | 185.01 |
| 5,887,978 | 03/30/99 | Lunghofer et al. | 374 | 179 |
| 5,923,557 | 07/13/99 | Eidson | 364 | 471.03 |
| 5,924,086 | 07/13/99 | Mathur et al. | 706 | 25 |
| 5,940,290 | 08/17/99 | Dixon | 364 | 138 |
| 5,956,663 | 09/21/99 | Eryurek et al. | 702 | 183 |
| 5,970,430 | 10/19/99 | Burns et al. | 702 | 122 |
| 6,016,706 | 01/25/00 | Yamamoto et al. | 9 | 6 |
| 6,017,143 | 01/25/00 | Eryurek et al. | 700 | 51 |
| 6,047,220 | 04/04/00 | Eryurek et al. | 700 | 28 |
| 6,047,222 | 04/04/00 | Burns et al. | 700 | 79 |
| 6,119,047 | 09/12/00 | Eryurek et al. | 700 | 28 |
| 6,199,018 B1 | 03/06/01 | Quist et al. | 702 | 34 |
| 5,347,843 | 09/20/94 | Orr et al. | 73 | 3 |
| 5,637,802 | 06/10/97 | Frick et al. | 73 | 724 |
| 5,680,109 | 10/21/97 | Lowe et al. | 340 | 608 |
| 09/169,873 | 10/12/98 | Eryurek et al. | | |
| 09/175,832 | 10/19/98 | Eryurek et al. | | |
| 09/257,896 | 02/25/99 | Eryurek et al. | | |
| 09/303,869 | 05/03/99 | Eryurek et al. | | |
| 09/335,212 | 06/17/99 | Kirkpatrick et al. | | |
| 09/344,631 | 06/25/99 | Eryurek et al. | | |

UNITED STATES PATENT AND TRADEMARK OFFICE
CERTIFICATE OF CORRECTION

PATENT NO. : 6,859,755 B2
DATED : February 22, 2005
INVENTOR(S) : Eryurek et al.

It is certified that error appears in the above-identified patent and that said Letters Patent is hereby corrected as shown below:

Title page (cont'd),

| | | | | |
|---|---|---|---|---|
| 09/360,473 | 07/23/99 | Eryurek et al. | | |
| 09/369,530 | 08/06/99 | Eryurek et al. | | |
| 09/383,828 | 08/27/99 | Eryurek et al. | | |
| 09/384,876 | 08/27/99 | Eryurek et al. | | |
| 09/406,263 | 09/24/99 | Kirkpatrick et al. | | |
| 09/409,098 | 09/30/99 | Eryurek et al. | | |
| 09/409,114 | 09/30/99 | Eryurek et al. | | |
| 09/565,604 | 05/04/00 | Eruyrek et al. | | |
| 09/576,450 | 05/23/00 | David L. Wehrs | | |
| 09/606,259 | 06/29/00 | Evren Eryurek | | |
| 09/616,118 | 07/14/00 | Eryurek et al. | | |
| 09/627,543 | 07/28/00 | Eryurek et al. | | |
| 09/576,719 | 05/23/00 | Coursolle et al. | | |
| 09/799,824 | 03/05/01 | Rome et al. | | |
| 4,399,824 | 06/23/83 | Davidson | 128 | 736 |
| 5,269,311 | 12/14/93 | Kirchner et al. | 128 | 672 |

FOREIGN PATENT DOCUMENTS, insert

| | | |
|---|---|---|
| 59163520 | 09/14/84 | Japan |
| 60174915 | 09/09/85 | Japan |
| 11083575 | 03/26/99 | Japan |

UNITED STATES PATENT AND TRADEMARK OFFICE
CERTIFICATE OF CORRECTION

PATENT NO.    : 6,859,755 B2
DATED         : February 22, 2005
INVENTOR(S)   : Eryurek et al.

It is certified that error appears in the above-identified patent and that said Letters Patent is hereby corrected as shown below:

Title page (cont'd),
OTHER PUBLICATIONS, insert

Copy of International Search Report from Application Number PCT/US01/40791 with international filing date of May 22, 2001.
Copy of International Search Report from Application Number PCT/US01/40782 with international filing date of May 22, 2001.

Signed and Sealed this

Seventeenth Day of May, 2005

JON W. DUDAS
*Director of the United States Patent and Trademark Office*